United States Patent [19]

Robertson et al.

[11] 4,107,340
[45] Aug. 15, 1978

[54] METHOD OF REMOVING CORN FROM THE COB

[75] Inventors: George H. Robertson; Melvin E. Lazar, both of Berkeley; John M. Krochta, El Cerrito; Daniel F. Farkas, Piedmont; John L. Bomben, Mill Valley, all of Calif.

[73] Assignee: The United States of America, as represented by the Secretary of Agriculture, Washingon, D.C.

[21] Appl. No.: 817,889

[22] Filed: Jul. 21, 1977

Related U.S. Application Data

[63] Continuation of Ser. No. 680,643, Apr. 27, 1976, abandoned.

[51] Int. Cl.$^2$ ............................................. A23L 1/212
[52] U.S. Cl. .................................... 426/481; 426/482; 426/483; 426/518
[58] Field of Search ............... 426/615, 629, 618, 627, 426/478, 481, 482, 483, 484, 518, 809, 479; 99/567; 30/121.5; 130/6, 7, 8, 9 R, 9 A, 9 B, 9 C, 9 D, 9 E, 9 F; 83/4, 27

[56] References Cited

U.S. PATENT DOCUMENTS

| 1,037,382 | 9/1912 | Wentworth | 426/481 |
| 1,742,240 | 1/1930 | Douthitt | 426/482 X |
| 1,940,774 | 12/1933 | Sells | 426/481 X |
| 3,070,447 | 12/1962 | Webster | 426/481 |
| 3,734,752 | 5/1973 | Headley | 426/481 |

Primary Examiner—Arthur L. Corbin
Attorney, Agent, or Firm—M. Howard Silverstein; David G. McConnell; Theodore J. Leitereg

[57] ABSTRACT

Whole kernels of corn are removed intact from the cob by a method wherein the cob is first split longitudinally. Then, a force is applied to the kernels to remove them from the cob. The so-separated whole kernels may then be processed in conventional manner.

3 Claims, No Drawings

METHOD OF REMOVING CORN FROM THE COB

This is a continuation of application Ser. No. 680,643, filed Apr. 27, 1976 now abandoned.

BACKGROUND OF THE INVENTION

This invention relates to and has among its objects the provision of novel processes for removing corn from the cob. Further objects of the invention will be evident from the following description wherein parts and percentages are by weight unless otherwise specified.

Commercially, the most common method of separating kernels of corn from the cob is by cutting the kernels with a sharp blade. Unfortunately, it is not possible to obtain whole grains of corn; the cutting operation severs the upper part of the kernel from the lower part which remains on the cob. Thus, the hull of the kernel is broken open and part of each kernel is wasted (approximately 20% remains on the cob), including much or all of the germ of the kernel. Furthermore, during subsequent wet-processing, including washing and blanching of the severed kernels, part of the corn meat is leached from its pouch and lost. Not only is this loss economically detrimental, but a significant pollution problem is created. First of all, about 24 pounds of water is used to process each pound of edible corn. Secondly, the biological oxygen demand (BOD) of the effluent is extremely high. Processors have been forced at great expense to treat their processing liquors prior to disposal into public waterways.

SUMMARY OF THE INVENTION

The invention described herein provides a means for obviating the above problems. As a result of the invention kernels of corn can be separated intact from the cob. The benefits of the invention are realized by splitting the cob longitudinally into halves and applying a force to exposed rows of kernels to separate them from the cob.

One advantage of the invention is that waste is avoided. Thus, there is an increased yield from each bushel of corn.

Another advantage of the invention is that none of the germ or heart of the kernel is lost. Furthermore, the hull of the kernel is not broken. This protects the corn from the loss of valuable constituents such as occurs in the handling, processing, and packaging of corn kernels that have been cut from the cob and the hulls broken in accordance with the practices of the prior art.

An important advantage of the invention is that it may be practiced in the field. Since approximately two-thirds of the weight of an ear of corn is waste, much money would be saved because only the removed kernels of corn would need transporting. The waste could be left in the field and used as mulch.

The process of the invention is applied to raw corn. Thus, the removed kernels are ready for freezing, canning, or fresh market use.

DESCRIPTION OF THE PREFERRED EMBODIMENTS

In a first step in the process of the invention, the cob is split longitudinally, usually into halves. An important feature of this splitting is that damage to the kernels of the corn must be avoided. Otherwise, the splitting apparent be accomplished by any means apparent to one skilled in the art.

An example, by way of illustration and not limitation, of a technique for achieving a suitable longitudinal split in accordance with the invention follows: A hole is drilled through the center of the prehusked cob in a direction parallel to the cylindrical axis of the cob. Since it is important that the hole be centered, it is recommended that the hole be drilled from the wide end to the narrow end of the cob. The size of the hole is not critical but must be less than the diameter of the pithy core of the cob. In most cases a hole approximately 0.2 inch in diameter is suitable.

Following the drilling of the above-described hole, a wedge is driven into the cob along its longitudinal axis to effect the splitting. The width of the wedge should be approximately the width of the cob but should not be so wide as to sever any of the kernels. Preferably, the wedge is equipped with a centered pin, perhaps about 0.125 inch in diameter, to guide the wedge into the predrilled hole.

After the cob is split longitudinally into halves, a force is applied to the kernels to remove them from the cob. Usually, the force is applied first to the row of kernels adjacent to the split surface and subsequently thereafter to adjacent rows in a row by row fashion. In general, the force should be sufficient to separate the kernels from the cob. It is, of course, obvious that this force should not be great enough to cause damage to the intact kernels. The magnitude of the force to be applied depends on a number of factors such as the maturity and variety of corn, the angle of application of the force, etc.

It is within the compass of the invention to split the cob into pieces other than into halves. For example, the cob may be split into thirds, fourths, etc., without reducing the effectiveness of the method of the invention. In fact, there is an advantage in so splitting the cob. The kernels immediately adjacent to the split can be removed from the cob with less force than those in subsequent rows. However, splitting into multiple pieces increases handling etc.; thus, a reasonable compromise must be reached.

It is preferred to apply the force to the kernels at a particular angle, namely, 45° to the plane passing through the pedicels of all the kernels in the row and through the middle of the upper portion, i.e., the portion opposite the pedicel end, of the kernel. It is, however, not meant to limit the invention thusly. The force may be applied at any angle; the important point is that the force be sufficient to separate the kernels intact from the cob but maintain the kernels in a whole grain state.

Various means for applying the above-described force to the kernels will be evident to those skilled in the art.

Examples, by way of illustration and not limitation, follow:

The desired force may be applied by pressing a row of kernels on the cob half against a moving textured rubber surface. As each row of kernels is separated, the textured surface moves to the adjacent row and separates it. This movement is continued until all of the kernels have been separated.

The exposed rows of kernels may be presented to moving rubber faced paddles to effectuate separation in a manner similar to that described above.

Following separation of the kernels from the cob, the whole kernels are treated to remove cob fragments and the like. To this end the separated kernels may be screened or subjected to other suitable operation for removing such fragments. Then, the kernels are washed.

The kernels of corn may be cooked for immediate consumption, may be prepared for fresh market sale, may be preserved frozen, preferably in closed containers, or may be preserved by other conventional procedures, such as packing in a can, cooking in a pressure cooker, and the like.

The process of the invention may be applied to fresh corn, corn blanched on the cob, or to corn blanched and shell frozen on the cob either in the frozen or in the thawed state. The process may further be applied to field-dried corn.

EXAMPLE

Fresh-market corn (44 ears) was husked and desilked manually. The ears were divided into two lots--lot A and lot B. The average diameter of an ear was 4.41 cm.

Lot A was weighed (4.17 kg.) and a 0.19 in. hole was drilled into the pithy core of each ear for the length of the ear. The drilled ears weighed 4.15 kg.

Each ear was restrained by a flat plate at the tapered (or narrow) end. A wedge (2.2 cm. wide with an 8.3° pitch) was driven into each ear from the butt (or wide) end with a force of 60 lbs. As a result the 22 ears were split into 44 half-ears.

The half-ears contained, on the average, 5.9 whole rows of kernels, 0.75 rows of kernels which were greater than 50% long, and 0.75 rows which were less than 50% long. The total weight of the 44 half-ears was 4.08 kg.

A force of $2.45 \times 15^5$–$4.90 \times 10^5$ dyne was applied manually to each kernel, starting with the kernels in the row adjacent to the split and advancing in a row-by-row fashion until all of the kernels were removed from the cob. The treatment was repeated on the other half-ears.

A visual examination of the so-separated kernels indicated that they were intact and whole. Furthermore, the weight of 100 randomly-selected kernels was 40.4 g.

As a control the 22 ears of corn in lot B (4.18 kg.) were treated by conventional cutting techniques and apparatus to remove the kernels therefrom. The so-removed kernels were examined visually and it was noted that the kernels were not intact. Only the upper portion of the kernel was removed from the cob, which still contained the lower portion of the kernel. The weight of 100 randomly-selected kernels was 32.6 g.

A large sample (6.8 lbs.) of lot A kernels was washed in 50 lbs. of cold water and blanched in 50 lbs. of boiling water. The total carbonaceous material in the combined effluent was determined; the value based on a pound total carbon per 1000 pounds of kernels was 1.24.

The above washing and blanching operations were repeated on a large sample (6.25 lbs.) of lot B kernels. The value of the ratio of pound of carbon to 1000 pounds of kernels was 4.07 (total carbonaceous material in combined effluent).

The above example demonstrates at least two important advantages of the instant invention over the prior art process:

(1) The instant invention yields whole, intact kernels which are therefore greater in weight than kernels prepared according to conventional procedures, which yield less-than-whole kernels.

(2) The instant kernels lose much less of the corn meat during normal processing than conventionally-prepared kernels.

Having thus described our invention, we claim:

1. A method of removing whole kernels of corn from the cob, which consists of
   (a) longitudinally splitting the cob without damage to the whole kernels, and
   (b) applying a force to the kernels sufficient to separate whole kernels intact from the split cob, said force being applied to individual rows of kernels of corn commencing with the row adjacent the split and advancing to adjacent rows as the kernels are separated from the cob.

2. The method of claim 1 wherein the cob is split into halves.

3. The method of claim 1 wherein the force in Step b is applied at an angle of 45° to the plane passing through the pedicels of all the kernels in the row and through the middle of the upper portion of the kernel.

* * * * *